US006634284B2

United States Patent
Parker

(10) Patent No.: US 6,634,284 B2
(45) Date of Patent: Oct. 21, 2003

(54) TWINE TENSIONER FOR BALER

(76) Inventor: Donald R. Parker, 1434 Osborn Rd., Scottville, MI (US) 49454-9619

( * ) Notice: Subject to any disclaimer, the term of this patent is extended or adjusted under 35 U.S.C. 154(b) by 14 days.

(21) Appl. No.: 09/909,034

(22) Filed: Jul. 19, 2001

(65) Prior Publication Data

US 2003/0015104 A1 Jan. 23, 2003

(51) Int. Cl.⁷ .................... B69B 13/18; B69B 13/08
(52) U.S. Cl. ................ 100/2; 56/341; 100/13; 100/21
(58) Field of Search ............ 56/341, 343; 100/2, 100/7, 13, 32, 88, 5, 21

(56) References Cited

U.S. PATENT DOCUMENTS

| | | | | |
|---|---|---|---|---|
| 3,576,160 A | * | 4/1971 | Myer | 100/21 |
| 4,282,804 A | * | 8/1981 | Cools | 100/5 |
| 4,354,429 A | | 10/1982 | Boldenow et al. | |
| 4,502,646 A | | 3/1985 | Meiers | |
| 5,450,787 A | | 9/1995 | Horchler | |
| 5,829,346 A | | 11/1998 | Ast | |
| 5,894,790 A | | 4/1999 | Viaud | |
| 5,950,530 A | | 9/1999 | Clauss et al. | |
| 5,988,977 A | | 11/1999 | Gallagher et al. | |
| 6,016,646 A | | 1/2000 | Taylor et al. | |
| 6,050,052 A | | 4/2000 | Herron et al. | |

OTHER PUBLICATIONS

H1,819, United States Statutory Invention Registration, Published Dec. 7, 1999. J. Dale Anderson, Craig Pecenka, and Lavern R. Goossen, inventors.
Website, www.gehl.com/.
Website, www.gehl.com/ag/haytools/round_baler/belts.htm.
Website, www.gehl.com/ag/haytools/round_baler/features.htm.
Website, www.gehl.com/ag/haytools/round_baler/haypick.htm.
Website, www.gehl.com/ag/haytools/round_baler/density.htm.
Website, www.gehl.com/ag/haytools/round_baler/spec.htm.
Brochure, Case IHI, Case IH Round and Square Balers, ©2000, Case Corporation.
Brochure, New Holland Roll–Belt round Balers, ©1998, New Holland North America.
Brochure, New Holland Operators's Manual for Round Baler 640, 650, 660, Issue 8–94, Ford New Holland, Inc.
Brochure, John Deere Round Balers, John Deere, no date available.
Manual, Case IHI 8430 Round Baler Operators's Manual, ©1993, Hay and Forage Industries.
Manual, Gehl Company RB 1400 Baler Operator's Manual, Gehl Farm Equipment, no date available.

* cited by examiner

Primary Examiner—W. Donald Bray
(74) Attorney, Agent, or Firm—Price, Heneveld, Cooper, DeWitt & Litton

(57) ABSTRACT

A round bale baling apparatus includes an accumulator for rolling crop material into a round bale, a twine dispenser adapted to hold and dispense twine, and a twine tensioner. The twine tensioner is adjustable and includes an energizable actuator and switch for operating the actuator to adjust the twine tension. Specifically, the switch can be manipulated to selectively decrease tension on the twine during initial gripping of the free end of the twine by a rolling loose bale, and to selectively increase tension on the twine once the twine is sufficiently wrapped onto the bale to provide a secure pulling force. The actuator can be electric, such as a reversible DC motor or solenoid, or can be another energizable device actuable from a remote position. Methods related to the above are also defined.

27 Claims, 8 Drawing Sheets

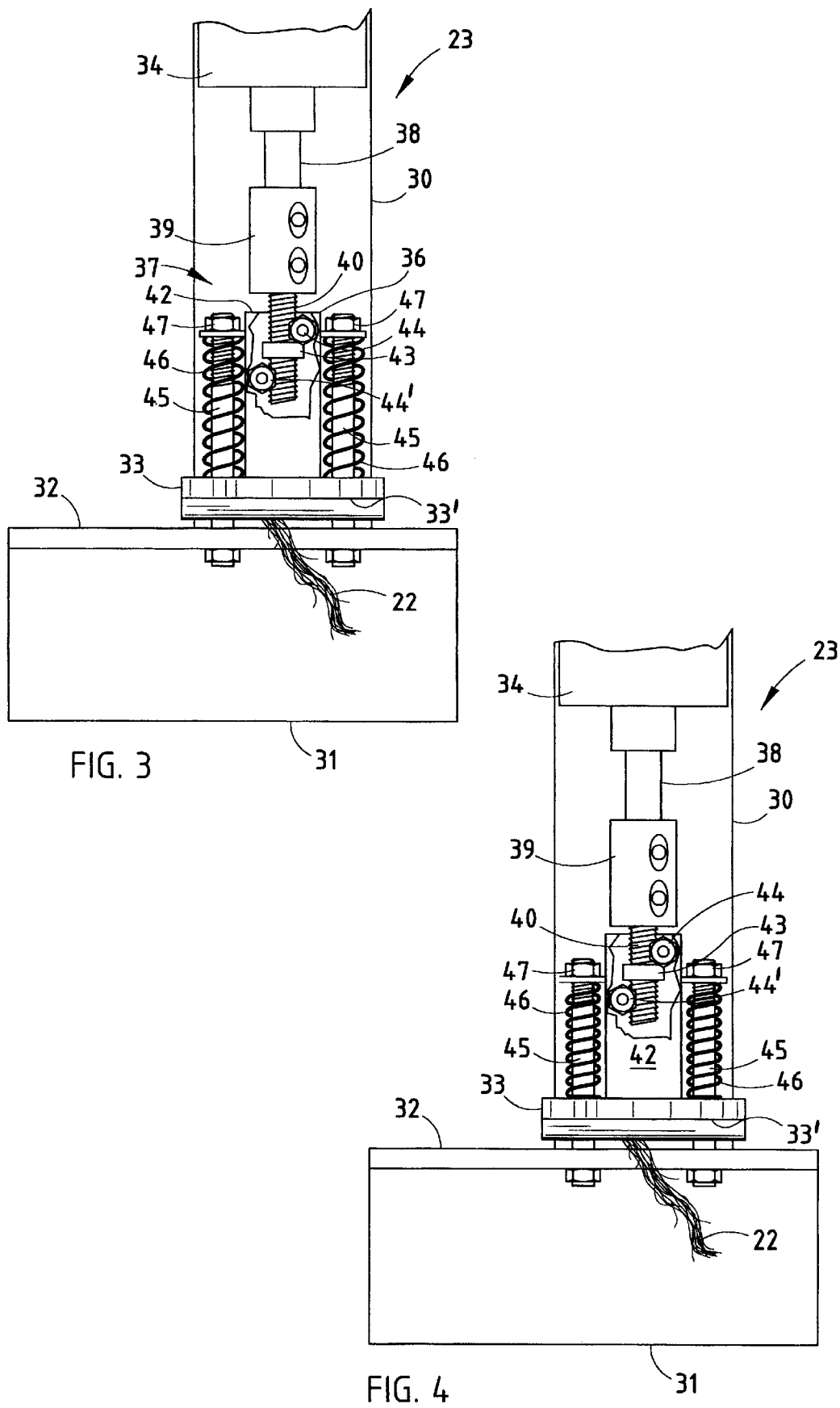

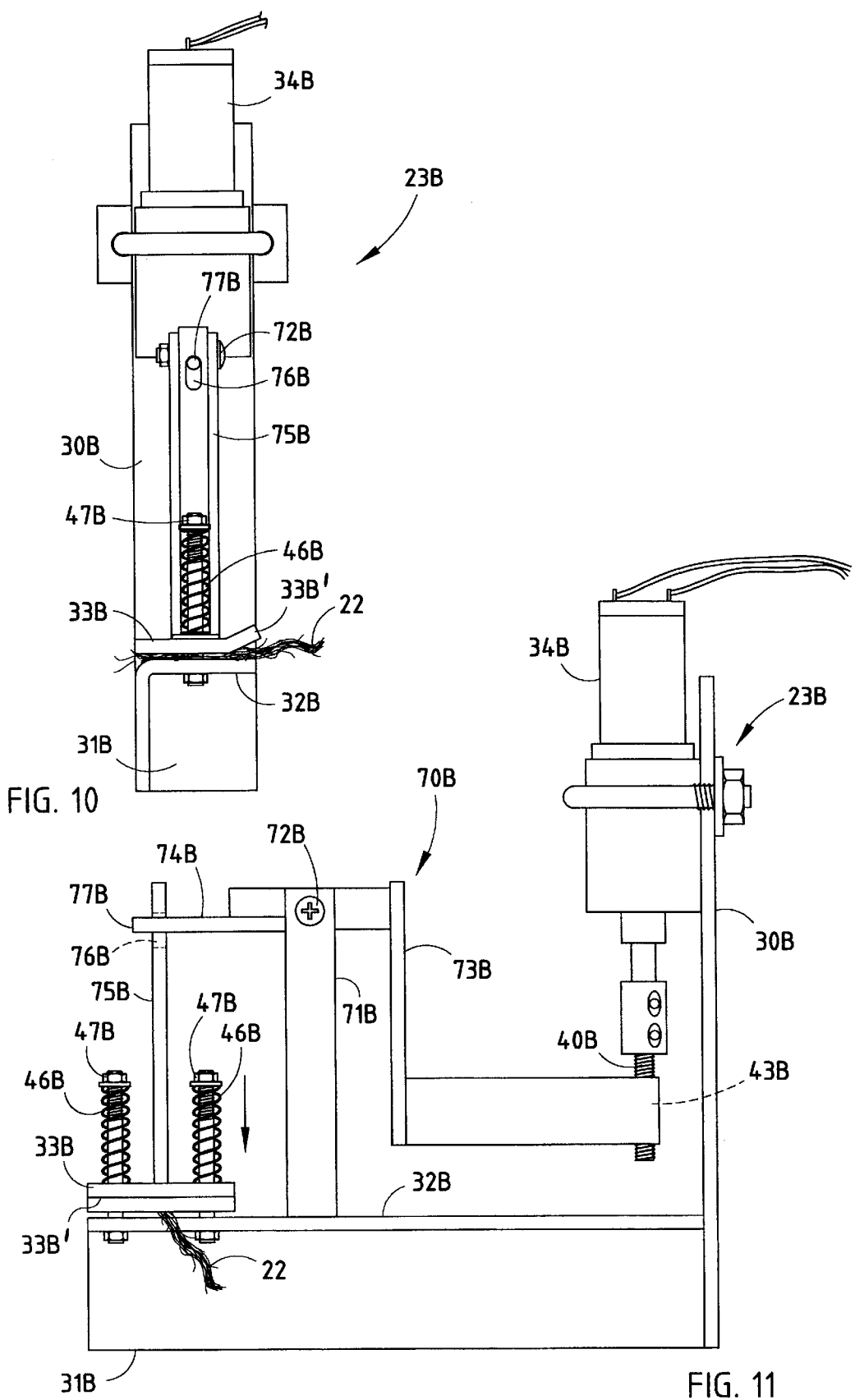

TWINE TENSIONER FOR BALER

BACKGROUND OF THE INVENTION

The present invention relates to twine tensioners for crop balers adapted to make round bales, where the twine tensioner regulates tension in the baler twine as the twine is applied to the round bales during the bale wrapping process.

A problem exists in the round hay baler industry. The problem is related to the fact that in order to start the bale wrapping process in most round balers, a relatively loose section of twine must be introduced into the hay feeder system at a location close to a rolling bale until the twine catches on or is grabbed by the bale and is drawn into the machine around the bale. Twine that is too tightly held or tensioned at the beginning of the operation will not catch on the bale, thus wasting time and creating frustration. Twine that is loose enough to be easily drawn into the machine and around a newly formed bale under most conditions is usually lacking in sufficient tension to adequately tightly wrap the bale. Loosely wrapped bales fail to retain their shape, do not handle well, and can fall apart, resulting in significant forage losses.

An additional problem is that knives for cutting twine function better when the knives make contact with well-tensioned twine. Thus, a poor twine tension not only leads to a poorly wrapped bale, but also can lead to poor cutting of the twine. This leads to wasted time for gathering crops.

Attempts have been made to remedy the above-described problems. However, such attempts have invariably led to systems that are extensive, expensive, cumbersome, complicated, and prone to breakdowns.

Accordingly, a twine tensioner is desired solving the aforementioned problems and having the aforementioned advantages.

SUMMARY OF THE PRESENT INVENTION

In one aspect of the present invention, an apparatus for balers includes an adjustable twine tensioner adapted to adjustably tension twine, an energizable actuator connected to the twine tensioner for adjusting the twine tensioner, and a control operably connected to the actuator for energizing and operating the actuator to selectively adjust the twine tensioner during a bale wrapping process of a baler, and thus selectively increase and decrease tension in twine associated with the twine tensioner.

In a narrower aspect, the apparatus for making round bales includes a crop accumulator adapted to pick up and roll crop material into a round bale, a twine dispenser adapted to hold and dispense twine and to position a free end of the twine proximate the bale such that, as the bale is rolled, the free end of the twine catches on the bale and the twine is pulled around the bale. The twine tensioner is positioned to selectively tension the twine being dispensed from the twine dispenser to the crop accumulator.

In another aspect of the present invention, a method of tensioning twine includes steps of providing an adjustable twine tensioner adapted to adjustably tension twine, and providing an actuator operably connected to the twine tensioner for adjusting the twine tensioner. The method includes selectively switching the twine tensioner between high and low twine tensioning positions by operating a switch operably connected to the actuator to thus selectively increase and decrease tension in twine for optimal tension during the bale wrapping process.

In another aspect of the present invention, a method of tensioning twine around bales of crop material includes steps of extending a free end of twine close to a rotating bale of crop material until the free end is caught and pulled with a reliable pulling force by the rotating bale, with the twine, at most, loosely restrained by a twine tensioner, and after the free end is drawn around the bale sufficiently to establish a reliable pulling force, substantially increasing tension on the twine by the twine tensioner such that the twine is tensioned and drawn tight against the bale as the twine is wrapped repeatedly around the bale.

An object of the present invention is to provide an energizable twine tensioner that can be remotely controlled for selective twine tensioning without a need to dismount a tractor.

Another object of the present invention is to provide an electrically motivated means for adjusting twine tension in a round baler twine as that twine is introduced into the baler, with the twine tension being optimal and different at different segments of the bale wrapping operation.

These and other features, objects, and advantages of the present invention will become apparent to a person of ordinary skill upon reading the following description and claims together with reference to the accompanying drawings.

BRIEF DESCRIPTION OF DRAWINGS

FIG. 3 is a rear view of the twine tensioner in FIG. 2 with the tensioner being in a twine-tensioning down position;

FIG. 4 is a rear view similar to FIG. 3, but with the tensioner being in a twine-released up position;

FIGS. 10 and 11 are side and rear views of another modified twine tensioner similar to the twine tensioner of FIG. 3, but including a reversible DC motor drive that incorporates a pivot to reduce a rate of travel of the pressure foot.

DETAILED DESCRIPTION OF THE PREFERRED EMBODIMENT

Figure 1:
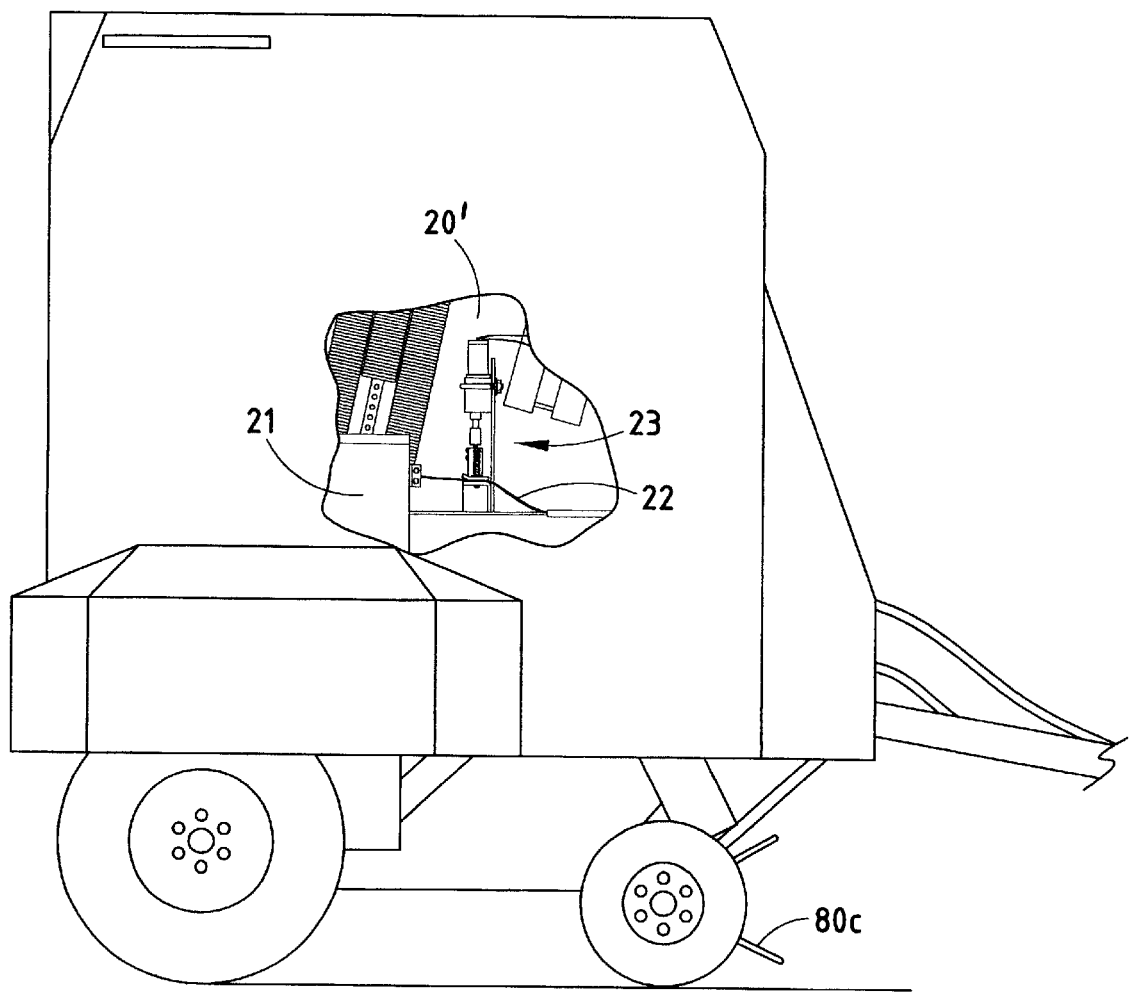
FIG. 1 is a side view of a round hay baler, including a side partially broken away to show an internal twine tensioner.
Figure 2:
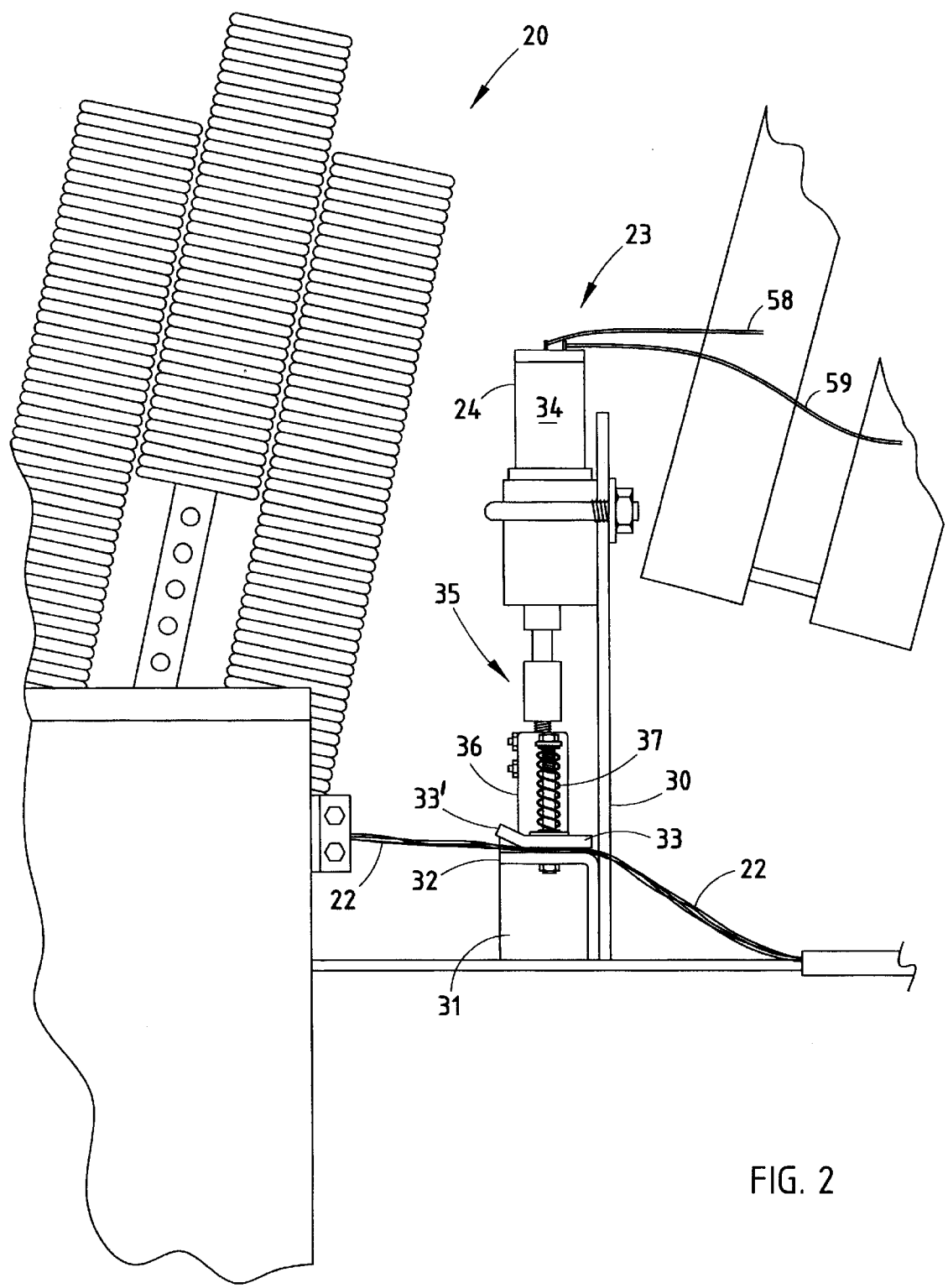
FIG. 2 is an enlarged fragmentary view of the twine tensioner of FIG. 1, the twine tensioner including a reversible DC motor drive.
Figure 5:
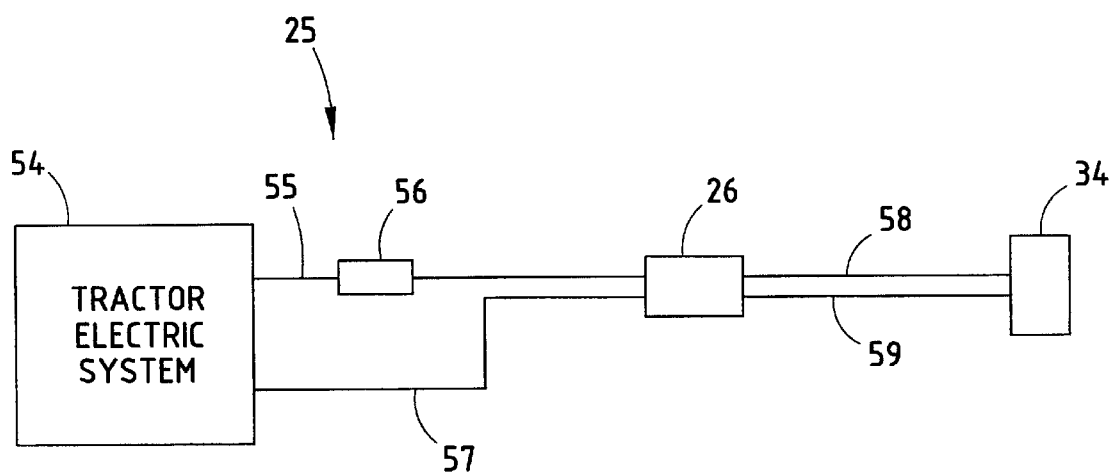
FIGS. 5 and 6 are electrical diagrams of the electrical circuit for operating twine tensioners of FIGS. 3 and 4A.
Figure 12:
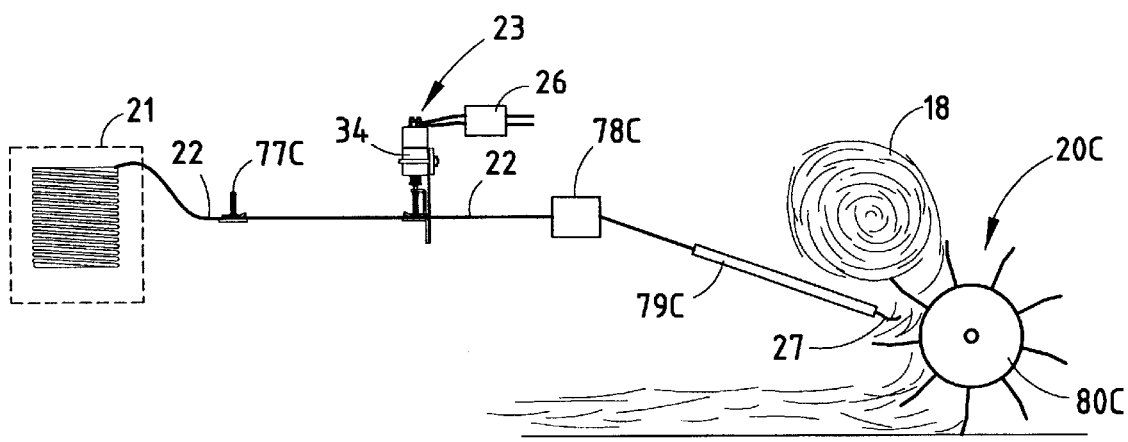
FIG. 12 is a schematic view showing an existing round baler retrofit with the present inventive apparatus.

A round bale baling apparatus (hereafter called baler 20) (FIG. 1) includes an accumulator chamber 21' for receiving and rolling crop material into a round bale 18 (FIG. 12). The baler 20 (FIG. 1) includes a twine dispenser 21 adapted to dispense twine 22 around each newly formed round bale, and a twine tensioner 23 for variably controlling twine tension as the bale 18 is rolled and the twine 22 is wrapped around the bale 18. The twine tensioner 23 (FIG. 2) includes an energizable actuator 24 for adjusting the twine tensioner 23 to provide the variable twine tension to facilitate starting the wrapping process and also to provide sufficient tension after the twine 22 begins to wrap around the bale. An actuator control circuit 25 (FIG. 5) includes a switch 26 for selectively and remotely controlling operation of the actuator 24. By manipulating the switch 25, the twine tensioner 23 can be adjusted to a low tension (or no-tension condition depending on the tensioner design) which allows a free end 27 (FIG. 12) of the twine 22 to be easily and quickly grabbed by the rotating bale 18. By further manipulating the switch 25, the twine tensioner 23 can be adjusted to a higher tension once the twine 22 is reliably grasped by the bale 18, thus allowing the bale 18 to be wrapped with an optimal twine tension to create an optimally tight bale 18 that can be handled with minimal forage loss.

The illustrated twine tensioner 23 (FIG. 2) is mounted to a vertical plate 30 that forms an upright support. Nonetheless, it is contemplated that the twine tensioner 23 could be mounted on existing structure on the baler, if desired, or that the arrangement could be made non-vertical, if desired. The illustrated twine tensioner 23 includes an L-shaped bottom stand 31 with a top support plate 32 over which the twine 22 passes. The twine tensioner 23 includes a pressure foot 33 (sometimes called a "floater plate" herein) for pressing the twine 22 against a top surface of the support plate 32 to create tension in the twine 22. The actuator 24 includes a lift mechanism comprising a reversible DC motor 34, a drive mechanism 35 connected to the motor 34, a carrier bracket 36 attached to the foot 33 and operably connected to the drive mechanism 35, and an adjustable spring tensioning arrangement 37. The motor 34 is preferably a 12 volt 1/50 HP reversible DC motor so that it is easily connectable to the tractor electrical system, although it is contemplated that other electric or non-electric motors and actuators could be used. Specifically, it is contemplated that the present invention can include different actuators, such as hydraulic, pneumatic, or power-take-off driven actuators, such as are commonly found on modem tractors. The illustrated reversible DC motor 34 includes a rotatable shaft 38 (FIG. 3) and a coupler 39 for attachment to a threaded drive shaft 40. The carrier bracket 36 includes a box-like housing shaped to maintain a relatively clean area around the threaded drive shaft 40, and includes a top 42 and a bottom welded or otherwise secured to the foot 33. Notably, the support plate 32 and/or the foot 33 preferably includes an angled portion 33' (see FIGS. 2 and 3) forming an inlet chute to assist in feeding twine 22 into and under the foot 33. A drive nut 43 (FIG. 3) (which may include a washer, if desired) is captured within the housing to prevent rotation as threaded drive shaft 40 is rotated. Thus, the drive nut 43 moves upwardly or downwardly as the drive shaft 40 is rotated by the motor 34. A top bolt 44 extends transversely through the housing and is engaged by the drive nut 43 as the motor 34 rotates to lift the carrier bracket 36. As the carrier bracket 36 is lifted, the foot 33 is also lifted. A bottom bolt 44' can act as a bottom stop, but in the illustrated device, it is merely intended to prevent the nut 43 from coming off a bottom of the drive shaft 40.

A pair of guide bolts 45 extend vertically through the support plate 32 and through the foot 33. The bolts 45 each include a top section that extends about equal in height to the top 42, and a coil spring 46 is positioned on each bolt 45. A top nut 47 is threaded onto each bolt 45 to capture each spring 46 on the top section of each bolt. The springs 46 press on the foot 33, and by turning the top nut 47, the tension of springs 46 can be increased or decreased on the foot 33. When the foot 33 is lifted to its tension-relieved position (FIG. 4), the foot 33 is moved upwardly against a tension of the springs 46 and the springs 46 are compressed, thus releasing pressure on the twine 22 located between the support plate 32 and the twine 22. When the motor 34 is reversed, the foot 33 is lowered against the support plate 32 (FIG. 3), with the tension of springs 46 applying a downward pressure on the foot 33. By adjusting the top nut 47, the tension on the twine 22 can be adjusted to different twine-tensioning positions. Nonetheless, the reader should understand that adjustment of top nut 47 changes the tension given to the twine when the twine tensioner 23 is in a down position. It is the operation of motor 34 that causes the twine tensioner 23 to lift the foot 33 and move it to the tension-relieved position where the tension is minimal or nonexistent regardless of the position of top nut 47.

Figure 4A:
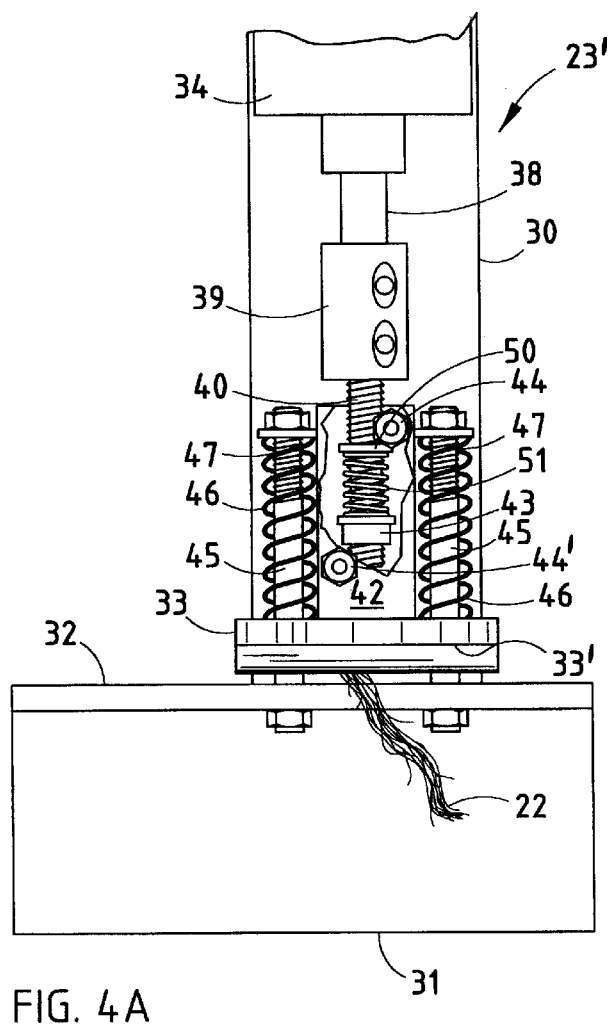
FIG. 4A is a rear view of a modified twine tensioner similar to the twine tensioner of FIG. 3 but having a spring-buffered release feature on its pressure foot.

In a modified twine tensioner 23' (FIG. 4A) a washer 50 is added above the drive nut 43, and a spring 51 is located between the washer 50 and the drive nut 43. The spring 51 is held in compression between the square drive nut 43 and the retainer screw 44. This compression of spring 51 exerts a vertically up force on the tensioner foot 33 in opposition to the vertically down force exerted by springs 46. The vertically down forces applied by springs 46 on the foot 33 are thus opposed by the combination of the twine compression force and the compression force existing in spring 51. At any given adjustment of springs 46, the clamping force of the tension foot 33 thus becomes adjustable depending upon the position of drive nut 43. The twine tension clamping force exerted on the twine by the foot 33 is readily adjustable simply by operation of the gear motor as controlled by the tractor mounted rocker switch 26. Thus by the addition of spring 51 to the embodiment as shown in FIG. 4, a means is possible, if desired, for slowing the vertical clamping motion of the foot 33. Precise adjustment of the resulting twine tension on the bale being wrapped is thereby more readily obtained by judicious use of the rocker switch 26.

Further adjustment of the action of the tensioner as illustrated in FIG. 4A is provided by carefully choosing the compression values of springs 46 and spring 51. This can be done in response to variations in design between balers and to variations in field conditions. Different operators may have preferences also.

Figure 6:
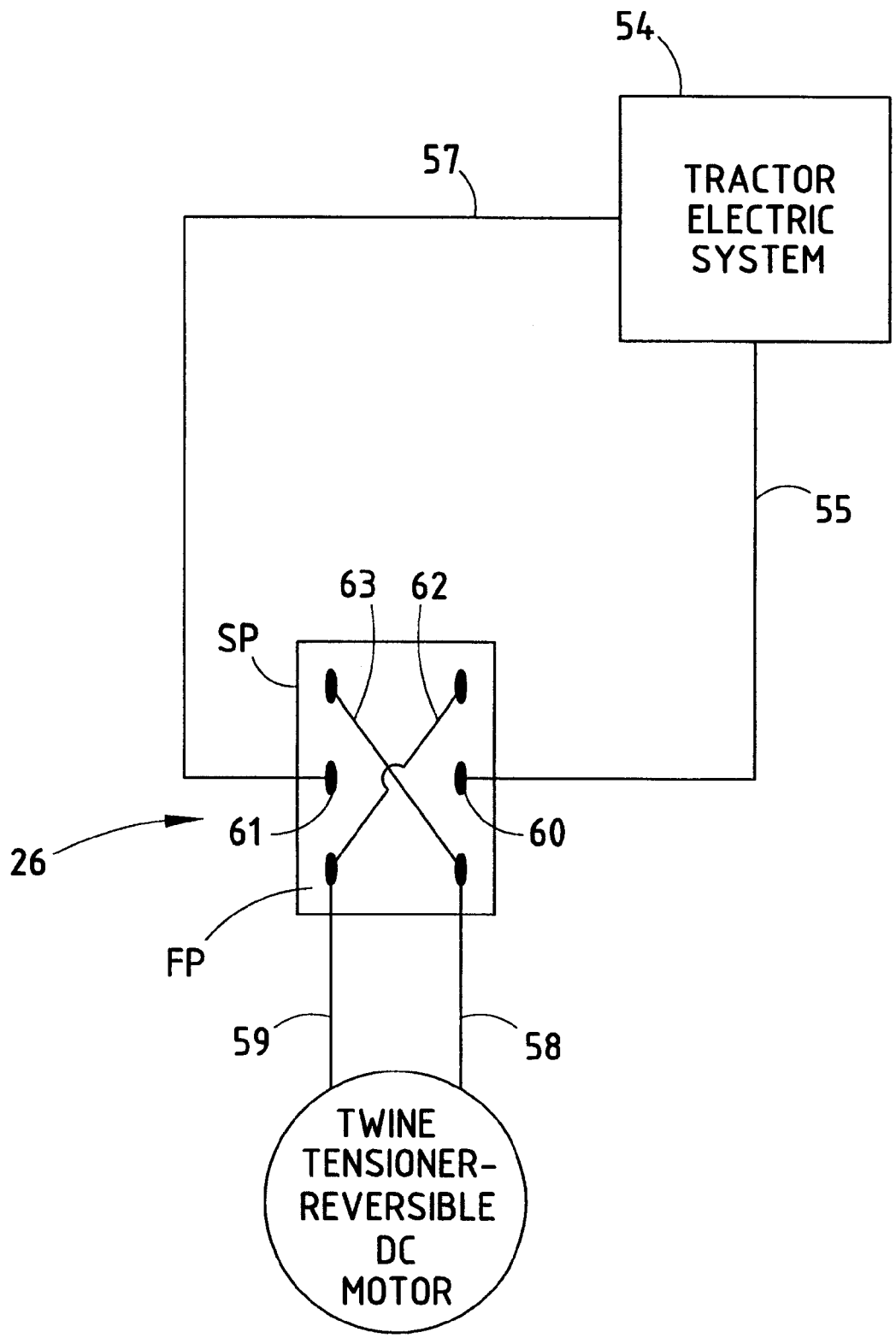
Figure 7:
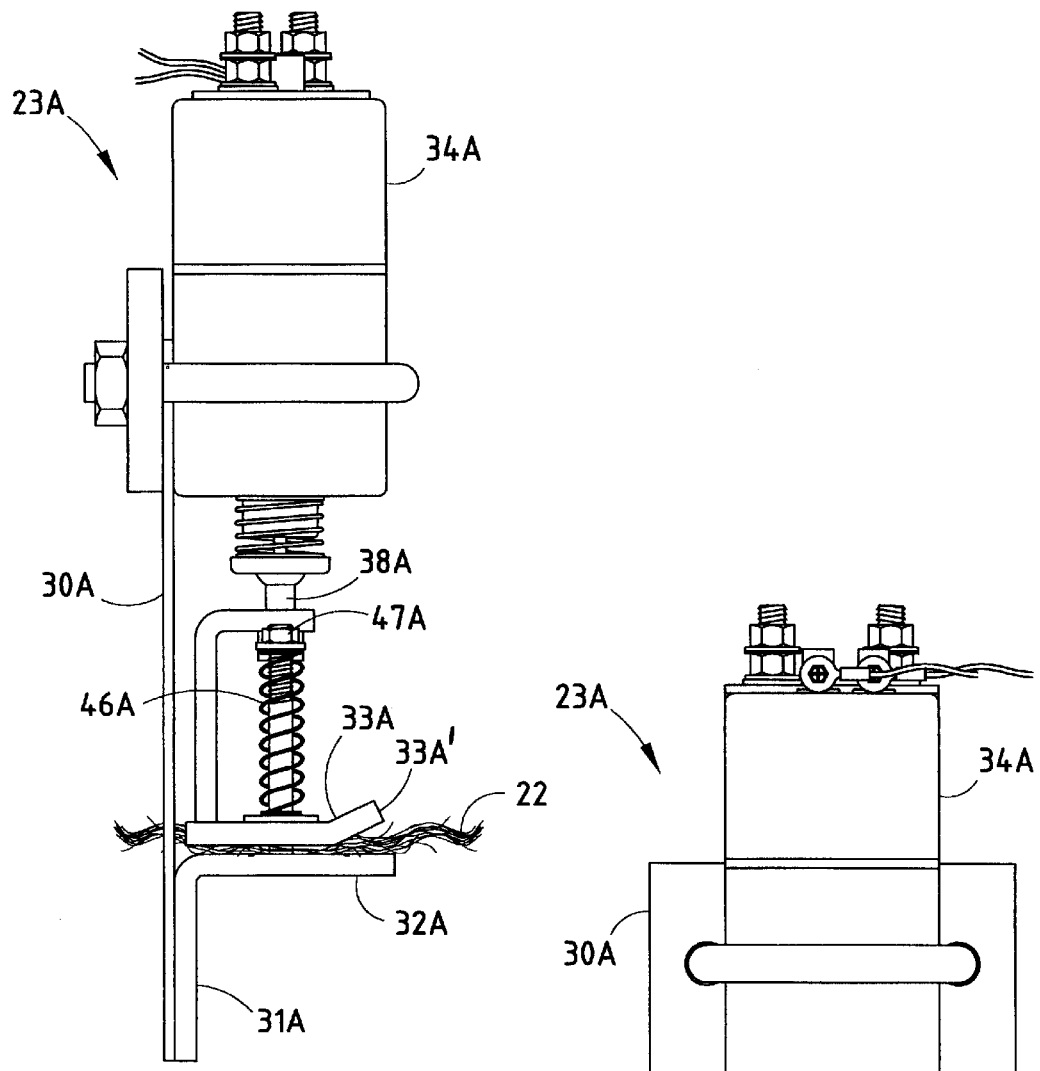
FIGS. 7 and 8 are side and rear views of a modified twine tensioner similar to the twine tensioner of FIG. 3, but including a solenoid drive.
Figure 8:
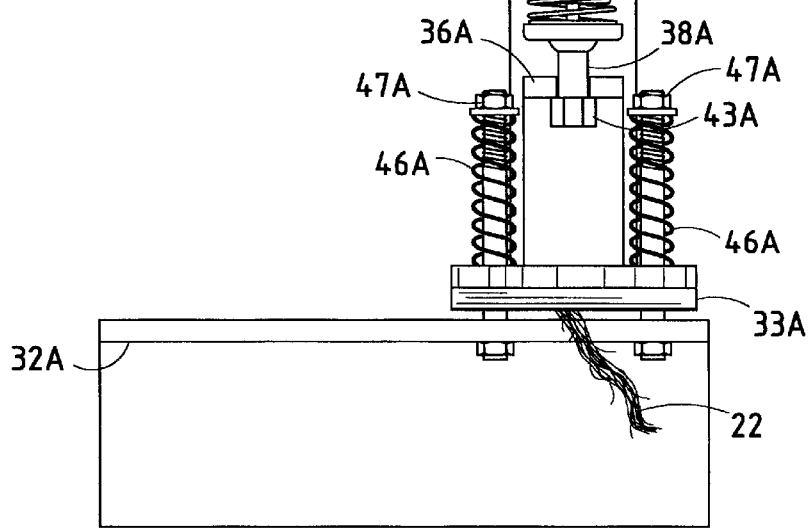
Figure 9:
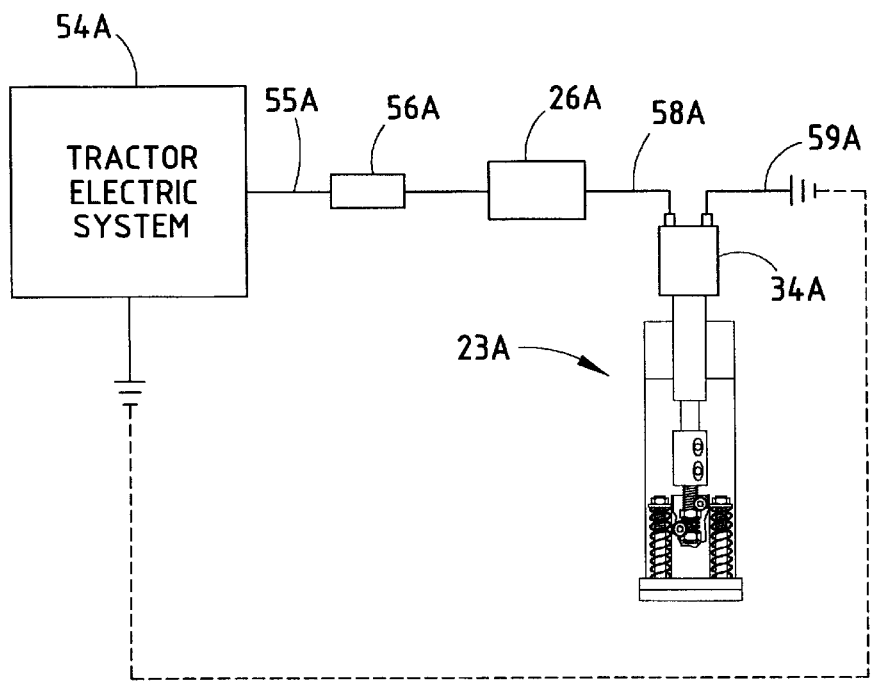
FIG. 9 is an electrical diagram of the electrical circuit for operating the twine tensioner of FIG. 7.

The control circuit 25 (FIG. 5) includes a power-side conductor 55 with a fuse 56 therein and a groundside conductor 57 operably connecting the switch 26 to the electrical system 54 of the tractor pulling the baler 20. Switch 26 further includes conductors 58 and 59 connected to the motor 34. The switch 26 (FIG. 6) is a double throw, double pole switch, spring-biased to a neutral "off" position, with the input and output nodes 60 and 61 connected to the conductors 55 and 57, respectively. The switching element (not shown) is movable to a first position FP where the node 60 is connected to the motor conductor 58, and where the node 61 is connected to the motor conductor 59, thus supplying 12v DC electrical power to the motor 34 for rotating the motor 34 in a first direction. The switching element is movable to a second position SP where the node 60 is connected to the motor conductor 59, and where the node 61 is connected to the motor conductor 58, thus supplying 12v dc electrical power to the motor 34 for rotating the motor 34 in an opposite second direction. This can be done with "cross wires" 62 and 63 as shown in FIG. 6.

Operation of the twine tensioner 23 is described as follows. The gear motor output shaft is reversible in response to changes in polarity of the voltage (12v) applied. Polarity change for shaft rotational direction change is accomplished using the double pole-double throw rocker switch 26. The illustrated switch 26 is mounted on the tractor and is conveniently labeled to indicate direction of tension change. Loosening or tightening can be indicated by a letter "L" or "T". The center or normal position of the switch 26 is the neutral or zero output position. Depressing or moving the rocker switch 26 to the "L" position will result in movement of the gear motor output shaft 38 in the clockwise direction as viewed from the up side. This rotation will cause vertical "up" travel of the threaded nut 43 on the short length of the threaded drive rod 40 coupled to the output shaft. This nut 43 cannot rotate as it is confined by its location in the lifter post (i.e. housing bracket 36). The threaded nut 43 is thus caused to travel vertically "up". Because it is in contact with the upper stop 44 upon the lifting post, this vertical motion of the threaded nut results in relief of the pressure (force) being exerted by the compression existing in the tension springs 46 upon the twine floater plate (i.e. foot 33) which in turn results in reduction of the clamping force existing between the floater plate and opposing base plate (32). This action thus gradually releases the twine to approximately zero drag as the motion continues. Twine tension is increased by reversing the action as outlined above by simply moving the rocker switch 26 in the opposite direction "T" position. Thus, any degree of desirable twine operating tension required for baling can be achieved without a need to leave the tractor seat. This is especially important since when starting the bale wrapping sequence, a relatively free twine is normally required to start the twine to wrap around a new round bale. But the twine must be more highly tensioned in order to maintain bale shape and integrity and to ensure clean severance of the twine by the knives at the end of the wrapping procedure.

Modified twine tensioners 23A and 23B (FIGS. 7–9 and FIGS. 10–11, respectively) are similar to the twine tensioner 23, and the same identifying numbers are used for identical or similar features and components, but with the addition of the letter "A" and "B", respectively. This is done to reduce redundant discussion and not for another purpose.

The modified twine tensioner 23A (FIG. 7) includes a solenoid 34A that replaces the DC motor 34. A shaft 38A extends from the solenoid 34A, and a nut 43A retains the shaft 38A to the carrier bracket 36A. A spring 65A is positioned around the shaft 28A and biases the solenoid shaft 38A to a normally extended position. In the extended position, the springs 46A bias the foot 33A to a twine-engaged tensioning position. When the solenoid 34A is electrically actuated, the shaft 38A is drawn into the solenoid 34A, causing the foot 33A to move against the bias of springs 46A and to move to a twine-loosened position. A push-button switch 26A (FIG. 9) replaces switch 26, and only a single conductor 55A (with fuse 56A) extends from the tractor electrical system 54A to push-button switch 26A, and a single conductor 58A extends to the solenoid 34A. A single conductor 59A extends to the ground on the baler 20A, which is electrically connected to the tractor electrical system 54A through the baler's hitch. By touching the push button switch 34A for a short time, the farm worker can actuate the solenoid 34A to raise the foot 33A and loosen tension on the twine 22 so that the twine 22 will be quickly and reliably grabbed by the rotating bale of crop material. Once the twine is securely grabbed, the push button switch 34A is released, and springs 46A bias the foot 33A against the twine 22 to tension the twine 22 for optimal bale wrapping.

Operation of the twine tensioner 23A is described as follows. This solenoid 34A operated twine tensioner provides two (2) levels of twine tension. When the solenoid 34A is energized by operation of switch 26A, it lifts the twine floater plate (i.e. foot 33A) and frees the twine 22 for trouble-free starts of the bale wrapping process. After the twine 22 is started, the solenoid 34A is de-energized and a higher level of tension desirable for wrapping is provided. The invention in this embodiment is electrically energized and utilizes an automotive-type solenoid (typically 12v). In this embodiment, the twine tensioner floater plate (i.e. foot 33A) is manually adjusted using the two adjusting nuts 47A to compress the tensioning springs 46A. The springs 46A are adjusted to provide optimal tension as required for the characteristics of the baler used and the type of hay being baled. The twine wrapping process begins when the twine placement tubes (arms or other mechanism) reach the desired location on the hay bale face. The twine 22 will start feeding into the baler when friction with the hay being drawn into the baler is sufficient to grasp the twine 22 and drag it into the hay feeder section. At this point in the process, the baler operator will momentarily (1 to 2 seconds) depress a push button switch 26A (normally off type) which will energize the solenoid 34A to lift the twine floater plate (foot 33A) and release the twine 22 for easy entry into the baler. This starts the wrapping process. The baler operator will then release the push button 26A to de-energize the solenoid 34A and the twine tensioner springs 46A return the floater plate (foot 33A) to its previously established set position for desirable twine tension. On many machines, operation of the solenoid at the start of the wrapping process can be electrically timed or synchronized with the twine placement mechanism to make the operation fully automatic, eliminating the operator's need to depress a push button.

The modified twine tensioner 23B (FIG. 10) is very similar to the twine tensioner 23, but the twine tensioner 23B includes a lever or pivot arm 70B that operates between the motor 34B and the foot 33B. The lever 70B is pivotally mounted on a stand 71B at pivot 72B. One arm 73B of the lever 70B includes a drive nut 43B that engages the threaded drive shaft 40B on the motor 34B. The second arm 74B includes a downwardly extending section 75B that engages and is secured to the foot 33B. The illustrated arm 73B is about twice an effective length of the arm 74B, such that the foot 33B moves about half the distance of the drive nut 43B, and with about half the velocity. The illustrated motor 34B has a 362:1 gear reduction, resulting in about 16 rpm. The joint between arm 74B and section 75B includes a slot 76B and loose pin 77B, providing flexibility to the joint, such as if a knot in the twine passes under foot 33B.

Operation of the twine tensioner 23B is described as follows. Switch 26 is closed to energize the gear motor 34 provides an output shaft torque of 120 oz. inches at 16 rpm. The rocker switch is used to reverse polarity of the DC gear motor circuit and allows reversal of the shaft rotational output. A ¼" diameter×1-¾ long threaded rod coupled to the gear-motor shaft rotates to cause a ¼" square machine nut, which is loosely fitted on the threaded rod to travel up or down on the rod since it is constrained from turning by confinement in the fork of the lifting lever. Rotation of the rod in the clockwise direction (when viewed from above) will result in a vertically-upward motion of the ¼" nut 43B (FIG. 11). This upward motion of the nut is transferred to the floater plate as a downward motion and increases the compression on the twine due to the rotation of lever 70B. The hole at the top of the floater plate lifting post is (i.e. lift bracket 75B) elongated to provide slack in the fit of the lever-operating rod. It will normally be in contact at the top of this opening with some slack (about ³⁄₁₆") under the extended operating lever rod. This insures freedom of movement and allows the floater plate (i.e. foot 33B) to respond to variations in twine thickness without significant variation in applied force. The motivating force is that established by previous adjustment of the tensioner adjusting springs 46B. Vertically up motion of the lifter reduces the total spring pressure and vertically down motion increases this pressure. Rotation of the gear motor shaft and coupled threaded rod in a counterclockwise direction (as viewed from above) will result in a vertically downward motion of the ¼" nut. The ¼" nut moving downward forces the forked end of the lever arm downward. This motion is transferred to the floater plate as a vertically upward motion and lifts the floater plate to reduce compression of the twine.

FIG. 12 shows attachment of the present twine tensioner 23 (or 23A or 23B) to an existing baler 20C. The baler 20C includes an existing mechanically-adjustable twine tensioner 77C, which is adjusted to a minimum force condition (i.e. no-tension). The twine 22C is extended from the twine dispenser 21C through the existing twine tensioner 77C and through the present inventive twine tensioner 23. The twine 22C is further extended through an existing twine guide 78C, through a directional twine tube 79C to a location adjacent the accumulator chamber (under which the pickup feeder 80C is located). The newly formed rolled bale, located in the accumulator chamber generally above the pickup reel, is rolled and a loose end of the twine 22C is positioned adjacent the rolling bale until the twine is grabbed by the bale. The twine tensioner 23 is then moved to a twine-tensioning position as the bale is further rolled and the twine is wrapped around the bale.

In the foregoing description, it will be readily appreciated by persons skilled in the art that modifications may be made to the invention without departing from the concepts disclosed herein. Such modifications are to be considered as included in the following claims, unless these claims by their language expressly state otherwise.

The invention claimed is:

1. An apparatus for balers comprising:
   an adjustable twine tensioner adapted to adjustably tension twine;
   an energizable actuator connected to the twine tensioner for adjusting the twine tensioner; and
   a control operably connected to the actuator for energizing and operating the actuator to selectively adjust the twine tensioner during a bale wrapping process in a baler and thus selectively increase and decrease tension in twine associated with the twine tensioner.

2. The apparatus defined in claim 1, wherein the actuator is electrically energizable.

3. The apparatus defined in claim 2, wherein the actuator includes a reversible motor.

4. The apparatus defined in claim 2, wherein the actuator includes a solenoid.

5. The apparatus defined in claim 1, wherein the control includes a switch.

6. The apparatus defined in claim 5, wherein the switch is positioned remotely from the twine tensioner and is adapted for mounting on a tractor.

7. The apparatus defined in claim 1, wherein the actuator includes a device providing a reduced velocity of actuation for the twine tensioner when the actuator is operated.

8. The apparatus defined in claim 1, wherein the twine tensioner includes a foot adapted to engage and create frictional drag on the twine.

9. The apparatus defined in claim 8, wherein the foot is movable between a twine-loosened position and a twine-tensioning position by the actuator.

10. The apparatus defined in claim 9, wherein the twine tensioner includes at least one first spring pressing on the foot to provide a preset pressure when the foot is in the twine-tensioning position.

11. The apparatus defined in claim 10, wherein the twine tensioner includes a second spring positioned to act in opposition to the first spring, the second spring being positioned to operate with decreasing force as the foot approaches and achieves the twine-tensioning position.

12. The apparatus defined in claim 1 including:
    a crop accumulator adapted to pick up and roll crop material into a round bale;
    a twine dispenser adapted to hold and dispense twine including an ability to position a free end of the twine proximate the bale so that, as the bale is rolled, the free end of the twine catches on the bale and the twine is pulled around the bale; and
    the twine tensioner being positioned to selectively tension the twine being dispensed from the twine dispenser as the twine extends toward the accumulator.

13. A twine tensioner device comprising:
    a twine tensioner including a pressure foot adapted to frictionally engage twine being pulled past the pressure foot; and
    an energizable actuator that is selectively actuable for moving the pressure foot between a twine-loosened position useful when twine is initially being grabbed and wound around a rolled bale of crop material and a twine-tightened position when twine has been grabbed and is being wound around the rolled bale.

14. The device defined in claim 13, wherein the actuator is electrically operated.

15. The device defined in claim 13, including a switch operably connected to the actuator for controlling operation of the actuator.

16. The device defined in claim 15, wherein the switch is located remote from the actuator.

17. The device defined in claim 13, wherein the twine tensioner includes at least one spring that biases the foot when the foot is in the twine tightened position, the spring controlling a maximum pressure of the foot on the twine.

18. A method of tensioning twine during a bale wrapping process comprising steps of:
    providing an adjustable twine tensioner adapted to adjustably tension twine and providing an actuator operably connected to the twine tensioner for adjusting the twine tensioner; and
    selectively switching the twine tensioner between high and low twine-tensioning positions by operating a switch operably connected to the actuator to thus selectively increase and decrease tension in twine for optimal twine tension during the bale wrapping process.

19. The method defined in claim 18, including decreasing twine tension prior to or simultaneously with positioning a free end of the twine adjacent a rolling bale of crop material.

20. The method defined in claim 18, including increasing twine tension simultaneously with or soon after a free end of the twine is grabbed by a rolling bale of crop material.

21. The method defined in claim 18, wherein the actuator is electrically operated, and including electrically operating the actuator to cause the actuator to operate.

22. The method defined in claim 21, wherein the actuator includes a solenoid.

23. The method defined in claim 21, wherein the actuator includes an electromechanical device.

24. The method defined in claim 18, wherein the twine tensioner includes a spring-biased foot adapted to engage twine and create a frictional drag on the twine, and engaging the foot with twine.

25. A method of tensioning twine around bales of crop material, comprising steps of:

extending a free end of twine close to a rotating bale of crop material until the free end is caught and pulled with a reliable pulling force by the rotating bale, with the twine at most loosely restrained by a twine tensioner; and after the free end is drawn around the bale sufficiently to establish a reliable pulling force, substantially increasing tension on the twine by the twine tensioner such that the twine is tensioned and drawn tight against the bale as the twine is wrapped repeatedly around the bale.

26. The method defined in claim 25, wherein the step of extending includes extending the free end a distance of less than about 12 inches.

27. The method defined in claim 25, including providing a remote switch, and wherein the step of increasing the tension includes operating the remote switch.

* * * * *

UNITED STATES PATENT AND TRADEMARK OFFICE
CERTIFICATE OF CORRECTION

PATENT NO. : 6,634,284 B2
DATED : October 21, 2003
INVENTOR(S) : Donald R. Parker It is certified that error appears in the above-identified patent and that said Letters Patent is hereby corrected as shown below:

<u>Column 3,</u>
Line 39, "modem" should be -- modern --

Signed and Sealed this

Fifteenth Day of June, 2004

JON W. DUDAS
*Acting Director of the United States Patent and Trademark Office*